United States Patent
Minnette et al.

(10) Patent No.: US 9,676,504 B2
(45) Date of Patent: *Jun. 13, 2017

(54) LID SEALING PROCESS

(71) Applicant: Berry Plastics Corporation, Evansville, IN (US)

(72) Inventors: Jeffrey C. Minnette, Evansville, IN (US); David J. Jochem, Evansville, IN (US); Ken Jochem, Mt. Vernon, IN (US)

(73) Assignee: Berry Plastics Corporation, Evansville, IN (US)

( * ) Notice: Subject to any disclaimer, the term of this patent is extended or adjusted under 35 U.S.C. 154(b) by 449 days.

This patent is subject to a terminal disclaimer.

(21) Appl. No.: 14/245,237

(22) Filed: Apr. 4, 2014

(65) Prior Publication Data

US 2014/0215974 A1    Aug. 7, 2014

Related U.S. Application Data

(63) Continuation of application No. 13/693,832, filed on Dec. 4, 2012, now Pat. No. 9,032,698, which is a (Continued)

(51) Int. Cl.
*B65B 7/28* (2006.01)
*B65D 43/02* (2006.01)
(Continued)

(52) U.S. Cl.
CPC ............ *B65B 7/2878* (2013.01); *B29C 65/18* (2013.01); *B29C 65/7841* (2013.01); (Continued)

(58) Field of Classification Search
CPC ..... B65B 7/285; B65B 7/2878; B29C 66/7373
(Continued)

(56) References Cited

U.S. PATENT DOCUMENTS 2,614,727 A    10/1952  Robinson
2,772,013 A    11/1956  Stover
(Continued)

FOREIGN PATENT DOCUMENTS

CH         652965 AS    * 12/1985  ......... B29C 66/7373
DE        1232873 B    *  1/1967  ........... B65B 7/2878
(Continued)

OTHER PUBLICATIONS

EPO machine translation of FR 1493462, retrieved Sep. 19, 2016, 5 pages.*

(Continued)

*Primary Examiner* — Stephen F Gerrity
(74) *Attorney, Agent, or Firm* — Barnes & Thornburg LLP

(57) ABSTRACT

A package includes a container and a lid adapted to mate with a brim of the container. The lid closes a top opening in the container when mounted on the container. In a lid-coupling process, a product is discharged from an interior product-storage region formed in the container. The elastic top wall of the lid is moved along the container brim to establish a radially outwardly moving brim-wiping motion to cause substantially all of any spilled product located on the annular brim to be displaced and wiped off the container brim so that little, if any, spilled product remains on the container brim.

13 Claims, 9 Drawing Sheets

Related U.S. Application Data continuation-in-part of application No. 13/544,753, filed on Jul. 9, 2012, now Pat. No. 8,991,632.

(60) Provisional application No. 61/505,441, filed on Jul. 7, 2011.

(51) Int. Cl.

| | | |
|---|---|---|
| *B29C 65/18* | (2006.01) | |
| *B29C 65/00* | (2006.01) | |
| *B29C 65/78* | (2006.01) | |
| *B29C 65/08* | (2006.01) | |
| *B29L 31/00* | (2006.01) | |

(52) U.S. Cl.
CPC .... *B29C 66/1312* (2013.01); *B29C 66/24221* (2013.01); *B29C 66/344* (2013.01); *B29C 66/542* (2013.01); *B29C 66/545* (2013.01); *B29C 66/723* (2013.01); *B29C 66/7373* (2013.01); *B29C 66/73521* (2013.01); *B29C 66/81423* (2013.01); *B29C 66/81425* (2013.01); *B29C 66/81427* (2013.01); *B29C 66/81431* (2013.01); *B29C 66/8322* (2013.01); *B29C 66/849* (2013.01); *B65B 7/2885* (2013.01); *B65D 43/0202* (2013.01); *B29C 65/08* (2013.01); *B29C 66/71* (2013.01); *B29C 66/7234* (2013.01); *B29C 2795/00* (2013.01); *B29L 2031/712* (2013.01); *B31B 2201/9061* (2013.01); *B65D 2543/00092* (2013.01); *B65D 2543/00296* (2013.01); *B65D 2543/00314* (2013.01); *B65D 2543/00425* (2013.01); *B65D 2543/00509* (2013.01); *B65D 2543/00537* (2013.01); *B65D 2543/00555* (2013.01)

(58) Field of Classification Search
USPC ..................... 53/478, 329.2, 329.3
See application file for complete search history.

(56) References Cited

U.S. PATENT DOCUMENTS

| | | | |
|---|---|---|---|
| 2,901,140 A | 8/1959 | Robinson | |
| 3,102,182 A * | 8/1963 | Oelze et al. | B29C 65/18 100/318 |
| 3,276,616 A | 10/1966 | Lurie | |
| 3,521,422 A * | 7/1970 | Tabor | B65B 7/285 53/420 |
| 3,679,509 A * | 7/1972 | Fielibert | B29C 66/7373 156/182 |
| 3,834,606 A | 9/1974 | Andersson | |
| 3,913,785 A | 10/1975 | Pattershall | |
| 3,934,749 A | 1/1976 | Andrulionis | |
| 3,938,686 A | 2/1976 | Milligan | |
| 3,956,550 A | 5/1976 | Sutch | |
| 4,044,941 A | 8/1977 | Knudsen | |
| 4,109,815 A | 8/1978 | Collins | |
| 4,111,330 A | 9/1978 | Jordan | |
| 4,141,463 A | 2/1979 | Smith | |
| 4,171,084 A | 10/1979 | Smith | |
| 4,192,434 A | 3/1980 | Conroy | |
| 4,209,107 A | 6/1980 | Crisci | |
| 4,215,797 A | 8/1980 | Chen | |
| 4,238,047 A | 12/1980 | Helms | |
| 4,252,248 A | 2/1981 | Obrist | |
| 4,258,529 A | 3/1981 | Smith | |
| 4,333,585 A * | 6/1982 | Del Bon | B65B 7/285 220/258.2 |
| 4,349,119 A | 9/1982 | Letica | |
| 4,356,930 A | 11/1982 | Roper | |
| 4,397,133 A | 8/1983 | Hume | |
| 4,418,834 A | 12/1983 | Helms | |
| 4,438,864 A | 3/1984 | Helms | |
| 4,442,971 A | 4/1984 | Helms | |
| 4,448,345 A | 5/1984 | Helms | |
| 4,495,749 A | 1/1985 | Faller | |
| 4,533,063 A | 8/1985 | Buchner | |
| 4,595,117 A | 6/1986 | Walter | |
| 4,685,273 A | 8/1987 | Caner | |
| 4,692,132 A | 9/1987 | Ikushima | |
| 4,738,374 A | 4/1988 | Ingemann | |
| 4,775,076 A * | 10/1988 | Horvath | B29C 66/7373 215/232 |
| 4,838,008 A | 6/1989 | Hardy | |
| 4,888,935 A * | 12/1989 | Wythoff | B65B 7/2878 53/329.3 |
| 5,015,313 A * | 5/1991 | Drew et al. | B29C 66/7373 156/275.1 |
| 5,032,213 A * | 7/1991 | Thomas, Jr. | B65B 7/2878 156/498 |
| 5,039,001 A | 8/1991 | Kinigakis | |
| 5,091,231 A | 2/1992 | Parkinson | |
| 5,097,107 A | 3/1992 | Watkins et al. | |
| 5,098,751 A | 3/1992 | Tamura | |
| 5,174,460 A | 12/1992 | Minnette | |
| 5,178,297 A | 1/1993 | Harold | |
| 5,246,134 A | 9/1993 | Roth | |
| 5,248,134 A | 9/1993 | Ferguson | |
| 5,258,191 A | 11/1993 | Hayes | |
| 5,316,603 A * | 5/1994 | Akazawa et al. | B29C 65/08 156/219 |
| 5,377,873 A | 1/1995 | Minnette | |
| 5,385,255 A | 1/1995 | Varano | |
| 5,395,005 A | 3/1995 | Yoshida | |
| 5,428,209 A | 6/1995 | Babu et al. | |
| 5,443,853 A | 8/1995 | Hayes | |
| 5,511,679 A | 4/1996 | Beck | |
| 5,634,567 A | 6/1997 | Hekal | |
| 5,647,501 A | 7/1997 | Helms | |
| 5,692,635 A | 12/1997 | Farrell | |
| 5,810,197 A | 9/1998 | Mazzarolo | |
| 5,911,334 A | 6/1999 | Helms | |
| 5,947,278 A | 9/1999 | Sawhney | |
| 5,950,861 A | 9/1999 | Roth | |
| 5,983,607 A | 11/1999 | Mihalov | |
| 6,032,823 A | 3/2000 | Bacon | |
| 6,053,353 A | 4/2000 | Helms | |
| 6,145,689 A | 11/2000 | Kobayashi | |
| 6,196,451 B1 | 3/2001 | Helms | |
| 6,234,386 B1 | 5/2001 | Drummond | |
| 6,439,387 B1 | 8/2002 | Bergman | |
| 6,508,375 B1 | 1/2003 | Krall | |
| 6,523,713 B1 | 2/2003 | Helms | |
| 6,637,176 B1 | 10/2003 | Krall | |
| 6,673,303 B2 | 1/2004 | White | |
| 6,749,066 B2 | 6/2004 | Bergman | |
| 6,772,901 B2 | 8/2004 | Witt | |
| 6,799,692 B2 | 10/2004 | Teixeira Alvares | |
| 6,857,561 B2 | 2/2005 | Williams | |
| 6,881,286 B2 | 4/2005 | Drummond | |
| 6,923,017 B2 | 8/2005 | Dais | |
| 7,055,713 B2 | 6/2006 | Rea | |
| 7,086,545 B2 | 8/2006 | Mannion | |
| 7,134,576 B2 | 11/2006 | Gringer | |
| 7,267,243 B2 | 9/2007 | Steg | |
| 7,311,218 B2 | 12/2007 | Varadarajan | |
| 7,584,866 B2 | 9/2009 | Selina | |
| 7,694,837 B2 | 4/2010 | Robertson | |
| 7,703,626 B2 | 4/2010 | Witt | |
| 7,757,879 B2 | 7/2010 | Schuetz | |
| 7,870,967 B2 | 1/2011 | Sawyer | |
| 7,938,293 B2 | 5/2011 | Gidumal | |
| 7,968,033 B2 | 6/2011 | Mazzarolo | |
| 8,245,873 B2 | 8/2012 | Steg | |
| 8,251,239 B2 | 8/2012 | Yeung | |
| 8,770,427 B2 | 7/2014 | Longo | |
| 8,991,632 B2 | 3/2015 | Minnette | |
| 8,998,030 B2 | 4/2015 | Minnette | |
| 9,032,698 B2 | 5/2015 | Minnette | |
| 9,067,347 B2 | 6/2015 | Naber | |
| 2002/0125253 A1 * | 9/2002 | Massey et al. | B29C 66/7373 220/359.4 |

(56) References Cited

U.S. PATENT DOCUMENTS

| | | |
|---|---|---|
| 2003/0010787 A1 | 1/2003 | Dalton |
| 2003/0019878 A1 | 1/2003 | Scarabelli |
| 2003/0183636 A1 | 10/2003 | Shih |
| 2004/0065698 A1 | 4/2004 | Braunstein |
| 2004/0159080 A1 | 8/2004 | Stewart |
| 2005/0145632 A1 | 7/2005 | Cocca |
| 2005/0167430 A1 | 8/2005 | Varadarajan |
| 2006/0278603 A1 | 12/2006 | Takashima |
| 2007/0108216 A1 | 5/2007 | Kurth |
| 2007/0187352 A1 | 8/2007 | Kras |
| 2007/0205196 A1 | 9/2007 | Burney |
| 2008/0110896 A1 | 5/2008 | Westphal |
| 2008/0264961 A1 | 10/2008 | Sawyer |
| 2009/0032534 A1 | 2/2009 | Luburic |
| 2009/0032535 A1 | 2/2009 | Dunwoody |
| 2009/0113851 A1 * | 5/2009 | Carr et al. .......... B29C 66/7373 53/478 |
| 2009/0302040 A1 | 12/2009 | Fox |
| 2010/0059537 A1 | 3/2010 | Stevens |
| 2010/0096388 A1 | 4/2010 | Kobayashi |
| 2010/0140282 A1 | 6/2010 | Steg |
| 2011/0100990 A1 | 5/2011 | Clodfelter |
| 2011/0240641 A1 * | 10/2011 | Huels et al. ........ B29C 66/7373 220/200 |
| 2012/0199599 A1 | 8/2012 | Minnette |
| 2012/0205375 A1 | 8/2012 | Hudson |
| 2012/0234835 A1 | 9/2012 | Minnette |
| 2012/0270167 A1 | 10/2012 | Sato |
| 2012/0305560 A1 | 12/2012 | Minnette |
| 2013/0008904 A1 | 1/2013 | Minnette |
| 2013/0032598 A1 | 2/2013 | Triquet |
| 2013/0047559 A1 | 2/2013 | Minnette |
| 2013/0099414 A1 | 4/2013 | Minnette |
| 2013/0104505 A1 | 5/2013 | Minnette |
| 2013/0112690 A1 | 5/2013 | Jongsma |
| 2013/0153577 A1 | 6/2013 | Su |
| 2013/0270143 A1 | 10/2013 | Muscato |
| 2013/0292394 A1 | 11/2013 | Minnette |
| 2014/0116977 A1 | 5/2014 | Minnette |
| 2014/0117025 A1 | 5/2014 | Minnette |
| 2014/0215974 A1 | 8/2014 | Minnette |
| 2014/0262916 A1 | 9/2014 | Minnette |
| 2014/0326735 A1 | 11/2014 | Minnette |
| 2015/0203263 A1 | 7/2015 | Minnette |
| 2016/0023820 A1 | 1/2016 | Minnette |

FOREIGN PATENT DOCUMENTS

| | | | |
|---|---|---|---|
| DE | 2434823 A1 * | 2/1976 | ......... B29C 66/7373 |
| EP | 0536137 B1 | 8/1995 | |
| EP | 1930253 | 2/2011 | |
| FR | 1493462 A * | 9/1967 | ......... B65B 7/2878 |
| FR | 2692224 A1 * | 12/1993 | ......... B65B 7/2878 |
| FR | 2827841 | 1/2003 | |
| FR | 2836460 A1 * | 8/2003 | ......... B29C 66/7373 |
| GB | 1408936 A * | 10/1975 | ......... B65B 7/2878 |
| JP | 01226503 A * | 9/1989 | |
| JP | 02219768 A * | 9/1990 | |
| JP | 03289462 A * | 12/1991 | |
| WO | WO 2004103845 A2 * | 12/2004 | ......... B65B 7/2878 |

OTHER PUBLICATIONS

JPO machine translation of JP 03-289462, retrieved Sep. 19, 2016, 9 pages.*
International Search Report dated Jun. 20, 2012, relating to International Application No. PCT/US2012/28010, 10 pages.
International Search Report dated May 11, 2012, relating to International Application No. PCT/US2012/023639, 9 pages.
International Search Report dated Sep. 28, 2012, relating to International Application No. PCT/US2012/045965, 7 pages.
Office action dated Aug. 29, 2013 for U.S. Appl. No. 13/362,953, 33 pages.
Office action dated Feb. 27, 2014 for U.S. Appl. No. 13/362,953, 31 pages.
Office Action dated Jun. 9, 2014 for U.S. Appl. No. 13/544,753, 14 pages.
International Search Report and Written Opinion dated Sep. 4, 2014, relating to International Application No. PCT/US2014/035837, 10 pages.
Office Action dated Aug. 18, 2015 for U.S. Appl. No. 13/661,704; 7 pages.
English summary of Mexican Office Action issued in connection to Mexican Patent Application No. MX/a/2013/008849, mailed Sep. 22, 2015, 4 pages.
PCT International Search Report and Written Opinion completed by the ISA/US on Mar. 19, 2015 and issued in connection with PCT/US2015/012497, 7 pages.
Office Action dated Jan. 21, 2016 for U.S. Appl. No. 13/661,704; 8 pages.
International Search Report and Written Opinion dated Dec. 22, 2015, relating to International Application No. PCT/US2015/041784, 11 pages.
Office Action dated Mar. 21, 2016 for U.S. Appl. No. 14/603,083; 9 pages.
Office Action dated Mar. 28, 2016 for U.S. Appl. No. 14/264,512; 16 pages.
European Search Report for Appl. No. 12745363.7 dated Jun. 20, 2014, 6 pages.
Chinese Office Action for Chinese Application No. 201480031650.0, 12 pages, mailed Jul. 29, 2016.
International Search Report and Written Opinion dated Apr. 14, 2014, relating to International Application No. PCT/US2013/070273, 8 pages.
Office Action dated Sep. 2, 2016 for U.S. Appl. No. 14/603,083; 8 pages.
European Search Report for European App. No. 14791028.5 received on Nov. 3, 2016, 8 pages.

* cited by examiner

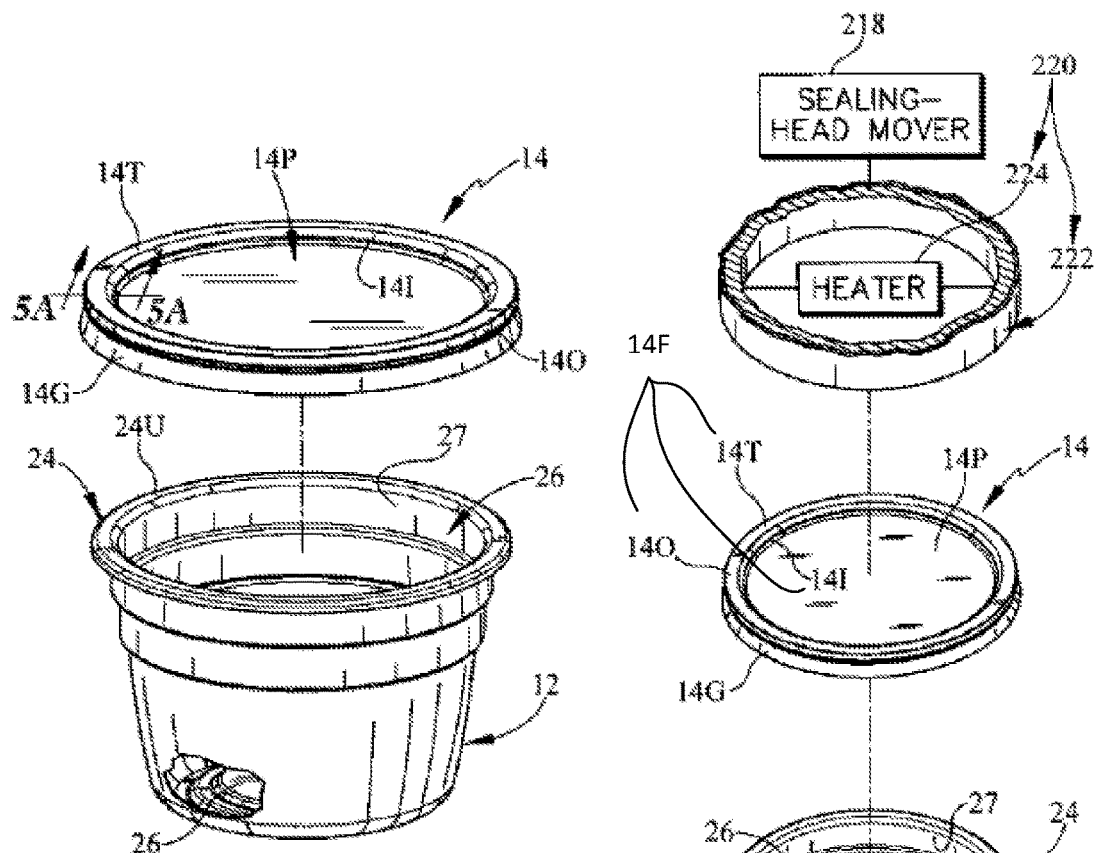
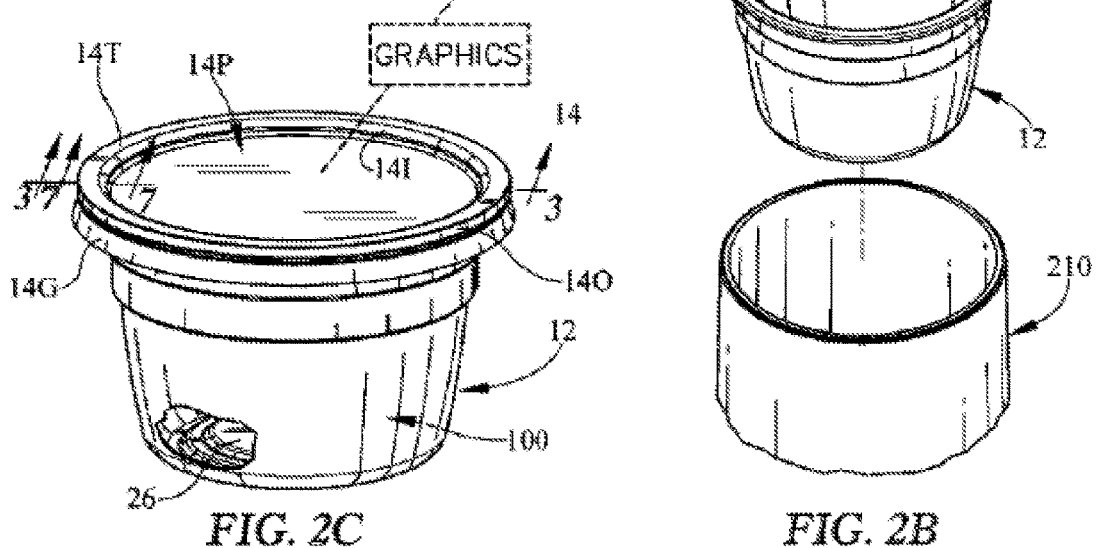
FIG. 2A
FIG. 2B
FIG. 2C

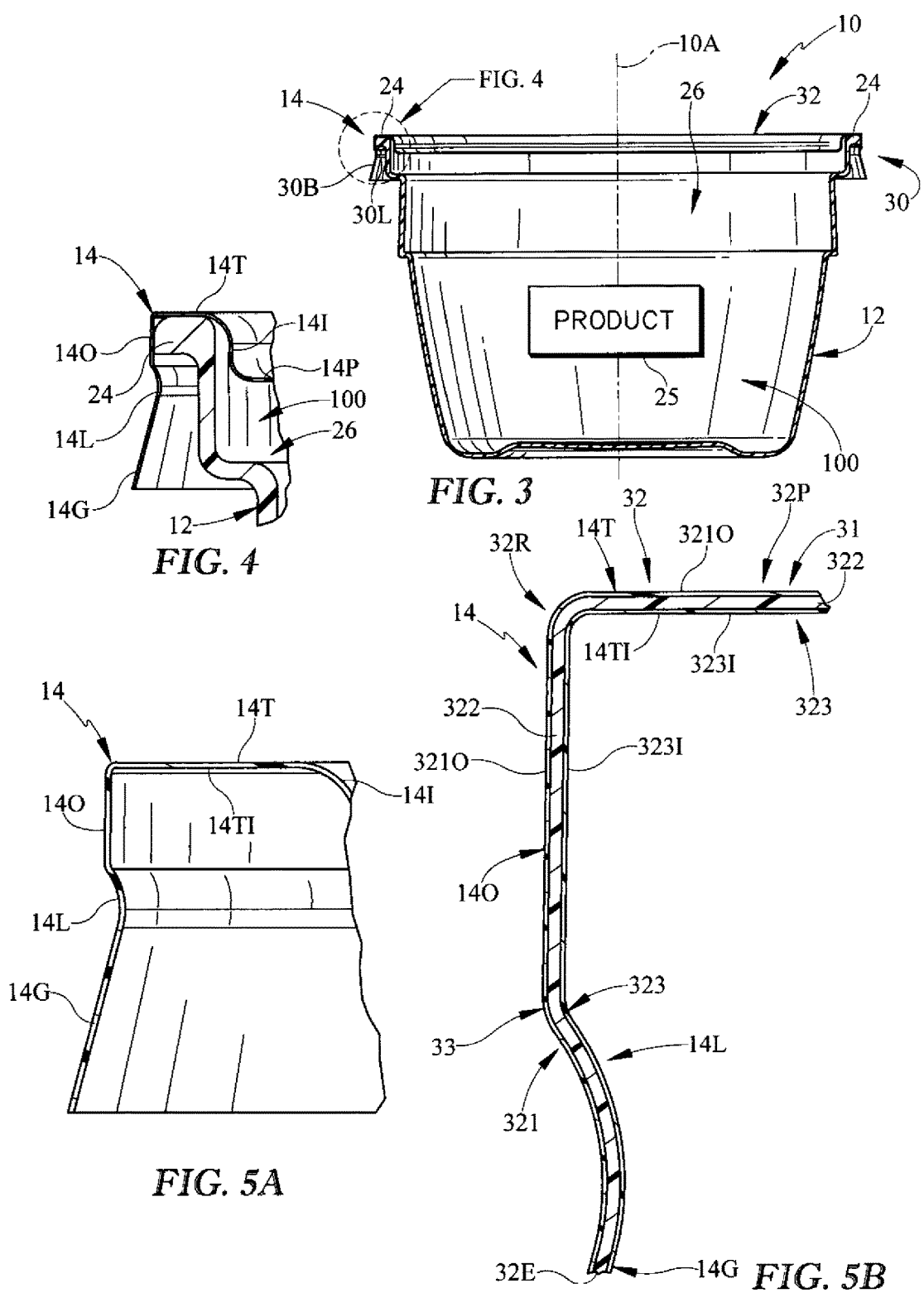

LID SEALING PROCESS

PRIORITY CLAIM

This application is a continuation U.S. application Ser. No. 13/693,832, filed Dec. 4, 2012, which is a continuation-in-part of U.S. application Ser. No. 13/544,753, filed Jul. 9, 2012, which claims priority under 35 U.S.C. §119(e) to U.S. Provisional Application Ser. No. 61/505,441, filed Jul. 7, 2011, each of which is expressly incorporated by reference herein.

BACKGROUND

The present disclosure relates to a package, and particularly to a package including a container and a system for sealing a closure for the container. More particularly, the present disclosure relates to a process for mounting the closure on a brim of a container filled with a product and moved on a conveyor included in a container filling and closing line at a factory.

SUMMARY

A package in accordance with the present disclosure includes a lid adapted to mate with a brim of a container to close an opening into an interior product-storage region formed in the container. In illustrative embodiments, the package is configured to store food in the product-storage region formed in the container.

In illustrative embodiments, the lid includes a brim-mount frame configured to be coupled to the brim of the container and a central plate surrounded by and coupled to an inner edge of the brim-mount frame. The brim-mount frame includes an elastic top wall configured first to wipe any spilled product from the annular brim during a container filling and closing process at a factory and then to be bonded chemically to an upwardly facing surface of the annular brim when exposed to heat at the end of that factory process.

In illustrative embodiments, the brim-mount frame includes an inner rim surrounding and mating with the central plate and an outer rim surrounding an outer peripheral surface of the annular brim and the inner rim. The elastic top wall of the lid has an annular shape and is arranged to lie between and interconnect upper edges of the outer and inner rims. The brim-mount frame also includes a radially inwardly extending lid-retention lip coupled to the outer rim and arranged to extend under the annular brim to anchor the brim-mount frame mechanically to the annular brim of the container and an annular finger-grip flange arranged to extend downwardly from the lid-retention lip. The lid is made of an elastic plastics material in an illustrative embodiment.

In an illustrative lid-coupling process in accordance with the present disclosure, a product (such as food) is discharged into an interior product-storage region formed in the container, then the elastic top wall of the lid is mated with a portion of the container brim and stretched as the lid is moved downwardly relative to the container under a force applied by a moving sealing head during coupling of the lid to the container. During such a stretching step, the elastic top wall is moved along the container brim to establish a radially outwardly moving brim-wiping motion to cause substantially all of any spilled product located on the annular brim to be displaced and wiped off the container brim so that little, if any, spilled product remains on the container brim and the surface area of the elastic top wall of the lid that mates with the underlying container brim is maximized.

In an illustrative lid-coupling process in accordance with the present disclosure, the elastic top wall of the lid is heated by a heater included in a movable sealing head that is used to couple the lid to the container brim. Sufficient heat is transferred to the elastic top wall of the lid to establish a chemical-bond sealing connection between the elastic top wall of the lid and an upwardly facing surface of the container brim. The chemical-bond sealing connection between the top wall of the lid and the container brim will be broken the first time the lid is removed from the container by a consumer. After that, the consumer can couple the lid to the container to create a temporary connection between the lid and the brim of the container.

In an illustrative process, the heat applied to the elastic top wall of the lid is high enough to cause any residual spilled product that may remain in a space provided on the container brim under the elastic top wall after exposure to the wiping action of the stretching elastic top wall to be gasified. The gasified residual spilled product will pass as a gas through the elastic top wall of the lid into the surroundings so that no spilled product remains on the container brim.

In illustrative embodiments, the lid is a single component comprising an outer rim, an inner rim surrounded by the outer rim, a top wall arranged to interconnect the outer and inner rims and to be heat-sealed to an upwardly facing surface of the container brim, a radially inwardly extending annular lid-retention lip coupled to the outer rim, and a central plate coupled to and surrounded by the inner rim. The lid also includes a downwardly extending frustoconical finger-grip flange arranged to lie below the outer rim. The lid is made of a stretchable elastic material. It is within the scope of the present disclosure to make the lid using a single plastics material or using two or more layers of plastics materials.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 2A is an enlarged perspective view of the container of FIG. 1 before a lid is coupled to a brim included in the container to close an opening into a product-storage region formed in the container and showing that the lid includes an annular brim-mount frame and a central plate coupled to an inner rim of the annular brim-mount frame;

FIG. 2B is an exploded perspective assembly view showing (from bottom to top) a portion of a container-receiving support fixture provided in a container filling and closing line at a factory, a container having a brim, a lid, a movable sealing head including an illustrative annular lid mover and a diagrammatic lid heater coupled to the annular lid mover, and a diagrammatic sealing-head mover also provided in the container filling and closing line at the factory and configured to provide means for moving the movable sealing head downwardly toward the container-receiving support fixture to engage the lid while the brim-mount frame of the lid rests on the brim of a container received in the container-receiving support fixture;

FIG. 2C is a perspective view of a package in accordance with the present disclosure and showing that the package includes a container and a lid coupled to the container;

FIG. 3 is a sectional view taken along line 3-3 of FIG. 2C showing the lid coupled to the brim of the container;

FIG. 4 is an enlarged partial sectional view taken from a circled region of FIG. 3 showing an annular lid-retention lip that is coupled to an outer rim included in the lid and arranged to extend inwardly into an outwardly opening undercut space defined by the container brim to lie under a downwardly facing surface of the container brim to retain a portion of the lid in a stationary position in sealing engagement with the container brim;

FIG. 5A is an enlarged sectional view of a portion of the lid taken along line 5A of FIG. 2A;

FIG. 5B is an enlarged dead-section view of a portion of the lid shown in FIG. 5A showing that in an illustrative embodiment the lid is multi-layered and comprises, in series, top to bottom (or left to right), an outer bed comprising a layer made of a plastics material, a core comprising a polypropylene layer, and an inner bed comprising a peelable and resealable sealant layer adapted to bond chemically to the container brim when the top wall of the lid is heated by the lid heater included in the sealing head to establish the chemical-bond sealed connection between the top wall of the lid and the container brim;

FIG. 8A shows the lid in a first engaged position on the container brim during a lid-mounting step at a factory and showing that some of the food that was discharged toward the interior product-storage region formed in the container during an earlier container filling step (see, for example, STEP 2 in FIG. 1) has landed on the brim of the container to form a mound of spilled food;

FIG. 8B shows the downwardly moving lid in a subsequent second engaged position on the container brim and showing that the mound of spilled food on the container brim has been compressed between the top wall of the lid and the brim of the container as a result of downward movement of the lid relative to the container brim;

FIG. 8C shows the downwardly moving lid in a subsequent third engaged position on the container brim and showing further compression of the mound of spilled food between the top wall of the lid and the brim of the container;

FIG. 8D shows the downwardly moving lid in a subsequent fourth engaged (coupled) position on the brim of the container to establish a mechanical coupling between the lid and the container brim and suggesting that a small first portion of the mound of spilled food located on the upwardly facing surface of the container brim has been pushed radially outwardly to lie along an outer peripheral surface of the container brim and a remaining second portion of the mound of spilled food remains on the upwardly facing surface of the container brim to provide a relatively thin layer of spilled food on the container brim;

FIG. 9A shows the downwardly moving lid in a subsequent fifth engaged position on the brim of the container after an inner rim of the lid engaged to a surrounding inner peripheral surface of the brim so as to stretch the top wall of the lid further in a radially outwardly directed top-wall stretching direction to displace some of the thin layer of spilled food remaining on the upwardly facing surface of the container brim and move it radially outwardly off the container brim and then downwardly through an opening provided between the lid and the brim to increase the surface contact area between the top wall and the container brim;

FIG. 9B shows further stretching of the top wall of the lid as the downwardly moving lid reaches a subsequent sixth engaged position on the container brim to stretch the top wall of the lid further so as to displace more spilled food and moved that displaced food off the container brim of the container to increase further the surface contact area between the top wall and the container brim;

FIG. 9C shows still more stretching of the top wall of the lid in relation to the relatively stationary inner rim of the lid as the downwardly moving lid reaches a subsequent seventh engaged position on the container brim to displace substantially all of the spilled food to increase still further the surface contact area between the wall and the container brim.

DETAILED DESCRIPTION

Figure 1:
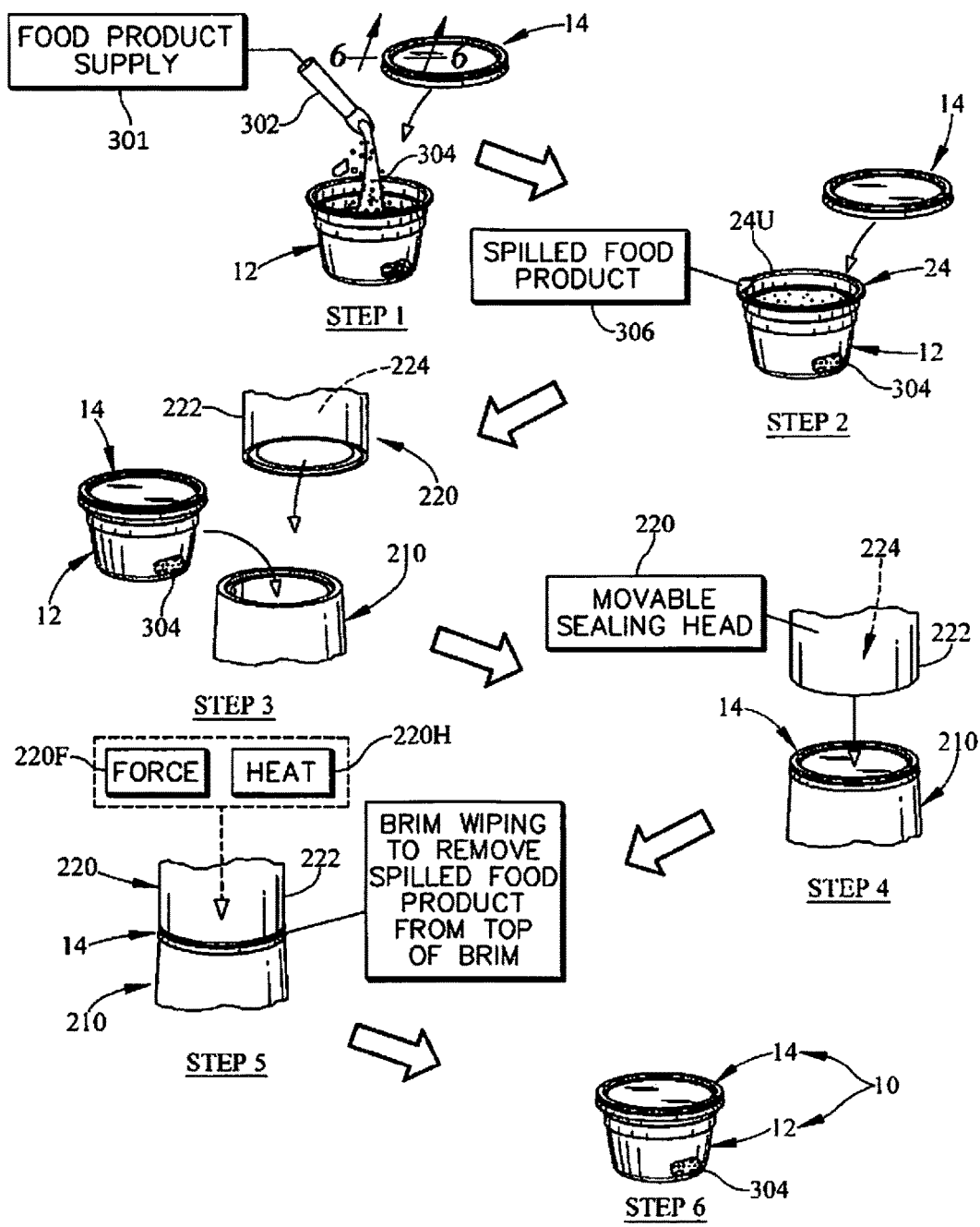
FIG. 1 shows an illustrative container filling and closing process in accordance with the present disclosure in which a container is moved on a conveyor in a factory and suggesting that the process includes the steps of: (1) filling the container with food; (2) placing a lid on the brim of the container; (3) placing the lid and container in a container-receiving support fixture arranged to lie under a movable sealing head; (4) moving the sealing head downwardly to engage the lid; (5) using the sealing head to apply downward force to the lid as the lid engages the brim of the container to couple the lid mechanically to the container brim as suggested in FIGS. 8A-8D and to wipe spilled food off the brim of the container while the lid remains coupled to the container brim as shown, for example, in FIGS. 9A-9C and using a heater provided in the sealing head to apply heat to the top of the lid while the lid remains mechanically coupled to the container brim to establish a chemical-bond sealed connection therebetween as suggested in FIG. 10; and (6) discharging a sealed package configured to be delivered to a consumer as shown in FIG. 10.

A lid 14 is coupled to a brim 24 of a container 12 using downwardly directed force 220F and heat 220H to provide a package 10 in a sequence of illustrative steps shown, for example, in FIG. 1. A top wall 14T of lid 14 is moved by a movable sealing head 220 in a container filling and closing process as suggested diagrammatically in STEP 5 of FIG. 1 and in FIGS. 9A-9C to wipe any spilled product 306 (e.g., food) that was deposited inadvertently on the container brim 24 during filling of container 12 as suggested in STEPS 1 and 2 of FIG. 1 off container brim 24 to maximize mating contact between an inner surface 14TI of top wall 14T of lid 14 and an upwardly facing surface 24U of container brim 24.

Figure 10:
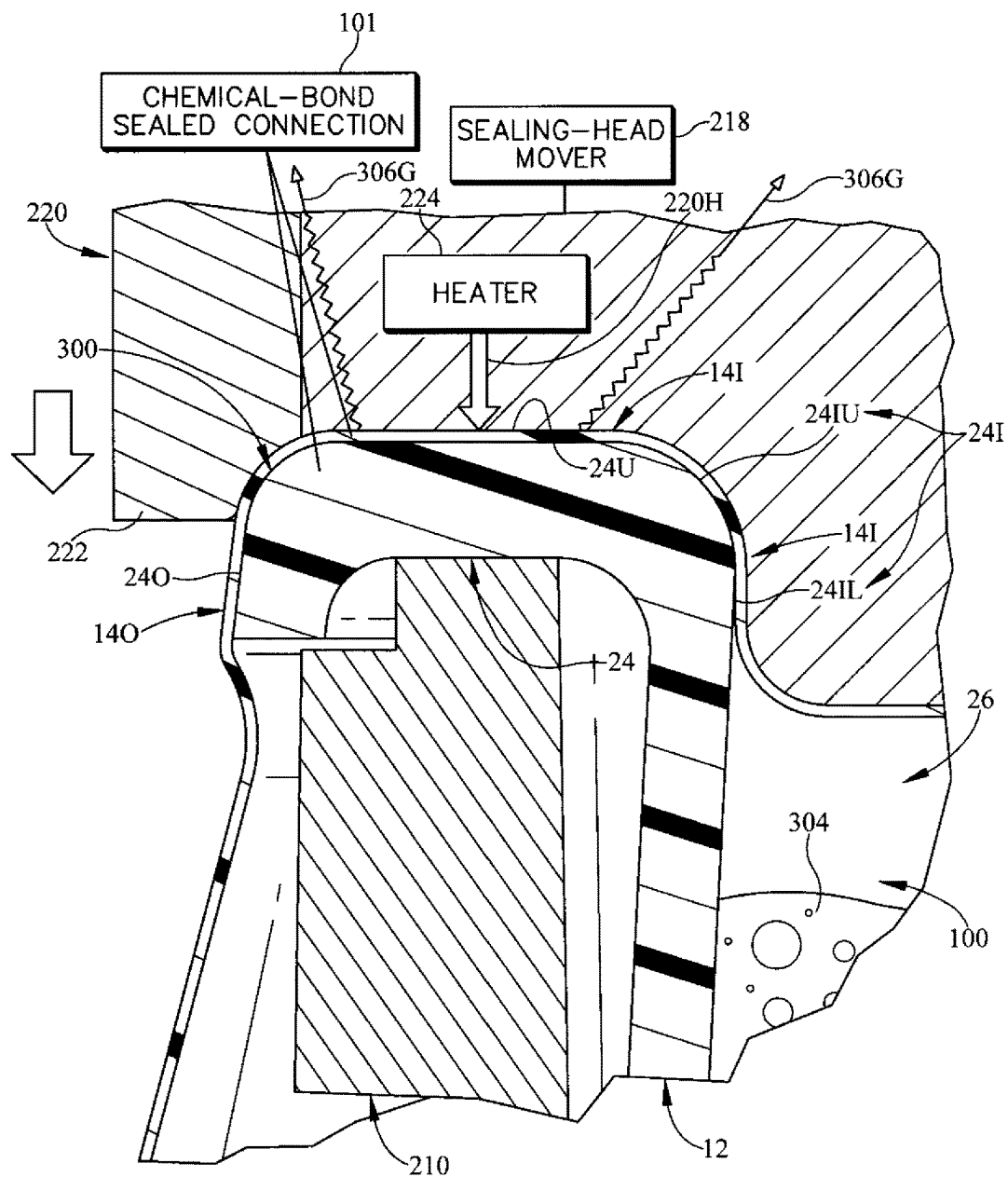
FIG. 10 shows that a heater provided in the sealing head has been activated to heat the stretched top wall of the lid to establish a chemical-bond sealed-connection between the stretched top wall of the lid and underlying portions of the container brim and shows diagrammatically that any minute quantity of residual spilled food left on the upwardly facing surface of the brim is gasified during exposure of the stretched top wall of the lid to heat from the heater and passed as a gas through the top wall of the lid to the surroundings.

A heater 224 provided in movable sealing head 220 is operated to apply heat 220H to the top wall 14T of lid 14 as suggested in STEP 5 of FIG. 1 and FIG. 10 while lid 14 is coupled mechanically to container brim 24. This applied heat 220H is sufficient to establish a chemical-bond sealed connection 101 between top wall 14T of lid 14 and container brim 24 at a container filling and closing factory as suggested in FIG. 10. This chemical-bond sealed connection will be broken the first time a consumer removes lid 14 from container 12. In illustrative embodiments, the applied heat 220H is high enough to cause any minute quantity of residual spilled product 306 extant on container brim 24 and located in a space provided between top wall 14T of lid 14 and container brim 24 to be gasified and pass as a gas 306G through top wall 14T of lid 14 into the surroundings as suggested diagrammatically in FIG. 10 so that no spilled product 306 remains on container brim 24.

An illustrative container filling and closing process is shown in FIG. 1. In STEP 1, a product 304 such as food is discharged from a food product supply through a dispenser 302 into an interior product-storage region 26 formed in container 12 before lid 14 is coupled to brim 24 of container 12. In STEP 2, it can be seen that some of food product 304 landed inadvertently on container brim 24 during STEP 1 to provide a mound of spilled product 306 on container brim 24. In STEP 3, the filled and lidded container 12 is placed in a container-receiving support fixture 210 that is arranged to lie under a movable sealing head 220 comprising a lid pusher 222 and heater 224 as suggested in FIG. 2B. It is within the scope of this disclosure to place container 12 in container-receiving support fixture 210 before STEP 1.

In STEP 4, the movable sealing head 220 is moved downwardly to cause lid pusher 222 to engage lid 14 while lid 14 is at rest on container brim 24. In STEP 5, lid pusher 222 of movable sealing head 220 is moved by a sealing head mover 218 to apply downwardly directed force 220F to lid 14 as lid 14 engages container brim 24 to couple lid 14 mechanically to container brim 24 as suggested in FIGS. 8A-8D. In STEP 5, a heater 224 provided in movable sealing head 220 is used to apply downwardly directed heat 220H to top wall 14T of lid 14 while lid 14 remains mechanically coupled to container brim 24 as suggested in FIG. 10 to establish a chemical-bond sealed connection 101 between top wall 14T of lid 14 and container brim 24. In STEP 6, a sealed package 10 comprising container 12 and lid 14 is presented and ready to be delivered to a buyer.

A package 10 in accordance with the present disclosure includes a container 12 and a lid 14 configured to mate with container 12 to close an opening 27 into an interior product-storage region 26 formed in container 12 as suggested in FIGS. 1-4. Lid 14 comprises a brim-mount frame 14F configured to mate with annular brim 24 of container 12 as suggested in FIGS. 2-4 and a center plate 14P coupled to an inner edge of brim-mount frame 14F as suggested in FIG. 2A. Brim-mount frame 14F comprises an outer rim 14O, an inner rim 14I surrounded by outer rim 14O, and a top wall 14T arranged to interconnect outer and inner rims 14O, 14I as suggested in FIG. 6. Center plate 14P is coupled to a lower edge of inner rim 14I in an illustrative embodiment as suggested in FIG. 6.

Figure 7:
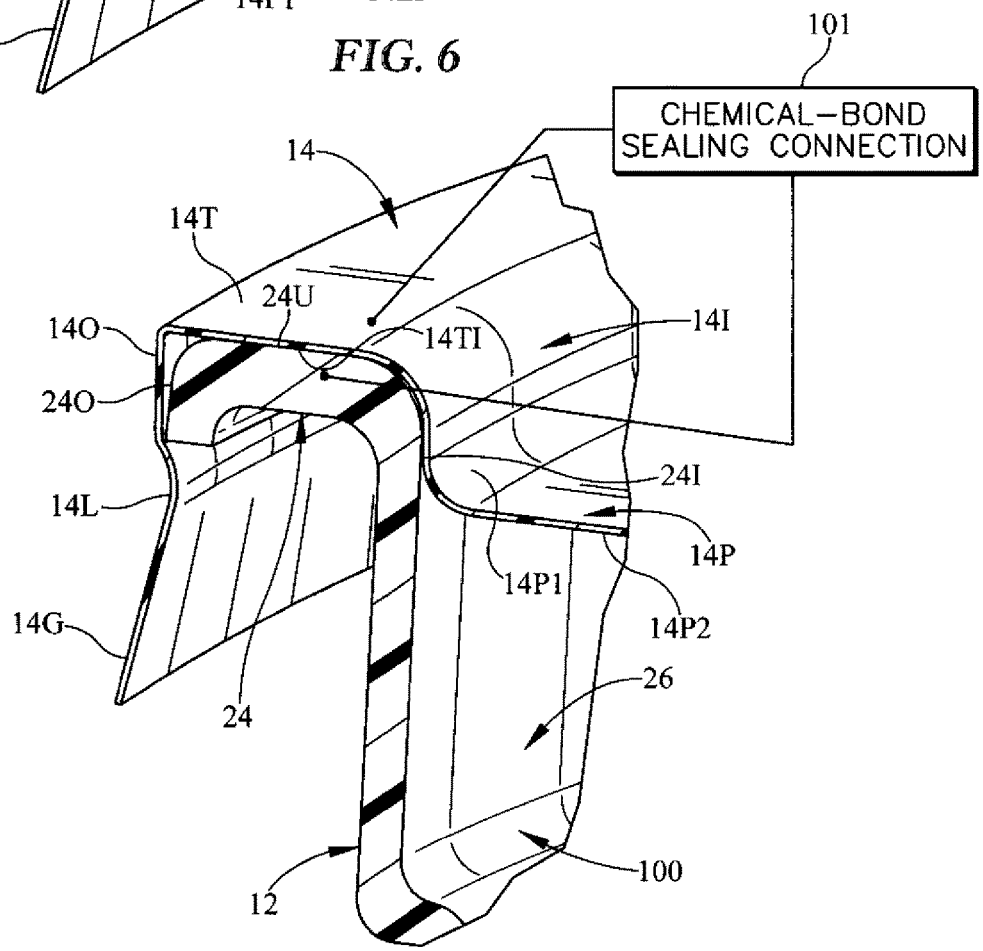
FIG. 7 is a view similar to FIG. 6 and taken along line 7-7 of FIG. 2C after the lid is mounted on the brim of container showing (1) mating engagement of a portion of the outer rim of the brim-mount frame and the outer peripheral surface of the container brim when the annular lid-retention lip is arranged to extend under the container brim and (2) mating engagement of the top wall of the lid and an annular upwardly facing surface of the container brim (after the lid was heated as disclosed herein) to establish a chemical-bond sealed connection between the top wall of the lid and the brim of the container.

Top wall 14T of lid 14 is heated by heat 220H generated by heater 224 to establish the chemical-bond sealed connection 101 between top wall 14T of lid 14 and container brim 24 as suggested in FIG. 7 during a lid-heating step included in the container filling and closing process in accordance with the present disclosure as suggested in FIGS. 1 and 10. This chemical-bond sealed connection 101 is broken the first time that lid 14 is removed from container 12 by a consumer. In illustrative embodiments, lid 14 includes a barrier material that is configured to mate temporarily and repeatedly with container brim 24 to establish a fluid seal therebetween whenever lid 14 is later mounted on container brim 24 by the consumer.

In an illustrative embodiment, brim-mount frame 14F is configured to mate temporarily in snapping relation with a portion of container brim 24 overlying an outwardly extending undercut space formed in container 12 so that container lid 14 is removable and reclosable as suggested in FIGS. 4 and 7. Lid 14 further comprises a lid-retention lip 14L that is coupled to outer rim 14O and arranged to extend radially inwardly under brim 24 to anchor brim-mount frame 14F mechanically to container brim 24.

Figure 6:
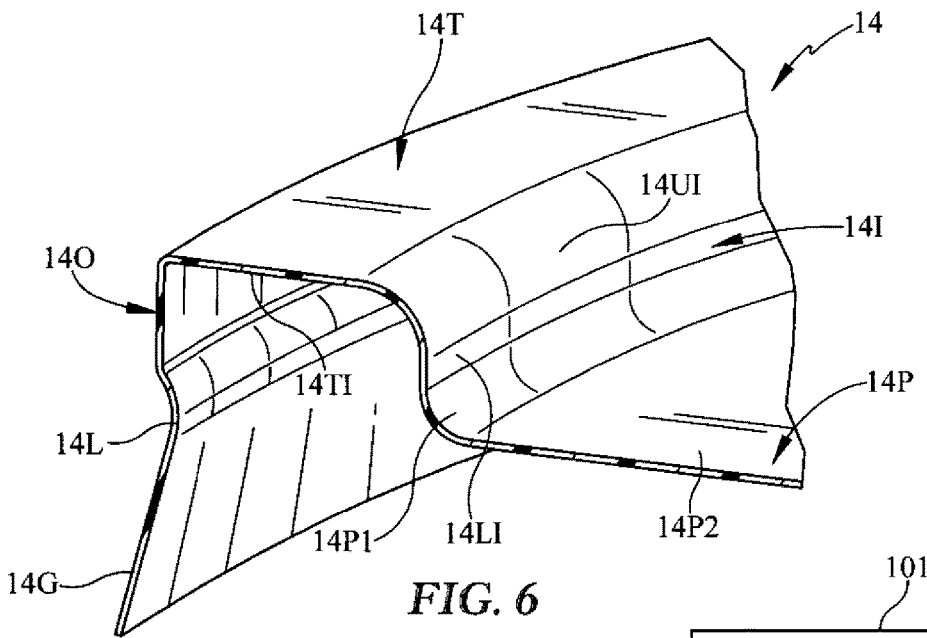
FIG. 6 is an enlarged perspective view of a section of the lid taken along line 6-6 in FIG. 1.

Lid 14 includes an outer rim 14O, a top wall 14T, an inner rim 14I, and a center plate 14P as shown, for example, in FIGS. 5A and 6. Outer rim 14O surrounds inner rim 14I. Top wall 14T interconnects upper edges of outer and inner rims 14O, 14I. Lid 14 further includes a downwardly extending frustoconical finger-grip flange 14G arranged to lie under outer rim 14O as suggested in FIG. 6. Lid-retainer lip 14L is also included in lid 14 and arranged to interconnect outer rim 14O and finger-grip flange 14G as suggested in FIGS. 5A and 6. Center plate 14P includes a cover foundation 14P1 coupled to inner rim 14I and arranged to overlie interior product-storage region 26 and a cover 14P2 surrounded by cover foundation 14P1 and coupled to cover foundation 14P1 as shown, for example, in FIG. 6. It is within the scope of this disclosure to provide a monolithic lid.

In an illustrative embodiment, lid 14 comprises multiple layers 321, 322, and 323 as shown, for example, in FIG. 5B. When formed as a multi-layer component in accordance with the present disclosure, lid 14 comprises an outer bed 321 having an outer surface 3210, an inner bed 323 having an inner surface 3231, and a core 322 interposed between and coupled to outer and inner beds 321, 323. Each of outer bed 321, core 322, and inner bed 323 is made of a different material in an illustrative embodiment. Outer bed 321 is made of polyester, polypropylene, or nylon. Core 322 comprises a barrier layer. Inner bed 323 includes low-density polyethylene, polypropylene-based sealant, blends of polypropylene and polybutane, as well as EMA-EVA-based sealants. In illustrative embodiments, inner bed 323 is made of a material that can be heat-sealed to brim 24 of container 12 as disclosed herein. In illustrative embodiments, inner bed 323 is made of a composition configured to establish a fluid seal every time lid 14 coupled with annular brim 24 of container 12 after lid 14 is first removed from container 12.

Brim 24 of container 12 is annular in illustrative embodiments. Brim 24 comprises an outer peripheral surface 24O, an upwardly facing surface 24U, and an inner peripheral surface 24I as suggested in FIGS. 7 and 89. Inner peripheral surface 24I includes a lower segment 24LI coupled to a side wall 12S of container 12 and an upper segment 24UI arranged to interconnect upwardly facing surface 24U and lower segment 24LI. In illustrative embodiments, upper segment 24UI has an annular convex round shape and lower segment 24LI has an annular shape as suggested in FIGS. 7 and 8. Inner peripheral surface 24I of annular brim 24 provides a relatively stationary abutment engaging the inner rim 14I of lid 14 during radially outward stretching of top wall 14T of lid 14 in top-wall stretching direction 14TS as suggested in FIGS. 9A-9C.

As suggested in FIG. 7 after lid 14 is mounted on brim 24 of container 12 there is: (1) mating engagement of outer rim 14O of brim-mount frame 14F and an outer peripheral surface 24O of container brim 24 when an annular lid-retention lip 14L is arranged to extend under the container brim 24 and (2) mating engagement of top wall 14T of lid 14 and an annular upwardly facing surface 24U of container brim 24 (after lid 14 was heated as disclosed herein) to establish a chemical-bond sealed connection 101 between the top wall 14T of lid 14 and brim 24 of container 12.

An illustrative process for moving lid 14 downwardly using the movable sealing head 220 to establish a mechanical coupling between lid 14 and container brim 24 is shown, for example, in FIGS. 8A-8D. As suggested in FIG. 8A, lid 14 is placed in a first engaged position on container brim 24 during a lid-mounting step at a factory. Some of the food 304 that was discharged through a dispenser 202 toward the interior product-storage region 26 formed in container 12 during an earlier container filling step (see, for example, STEP 2 in FIG. 1) has landed on brim 24 of container 12 to form a mound 306 of spilled food. As suggested in FIG. 8B, the downwardly moving lid 14 has arrived in a subsequent second engaged position on the container brim 24 to cause the mound 306 of spilled food on the container brim 24 to be compressed between top wall 14T of lid 14 and brim 24 of container 12 as a result of downward movement of lid 14 relative to container brim 24. As suggested in FIG. 8C, downwardly moving lid 14 has arrived in a subsequent third engaged position on container brim 24 to cause further compression of the mound 306 of spilled food between top wall 14T of lid 14 and brim 24 of container 12.

Figure 8A:
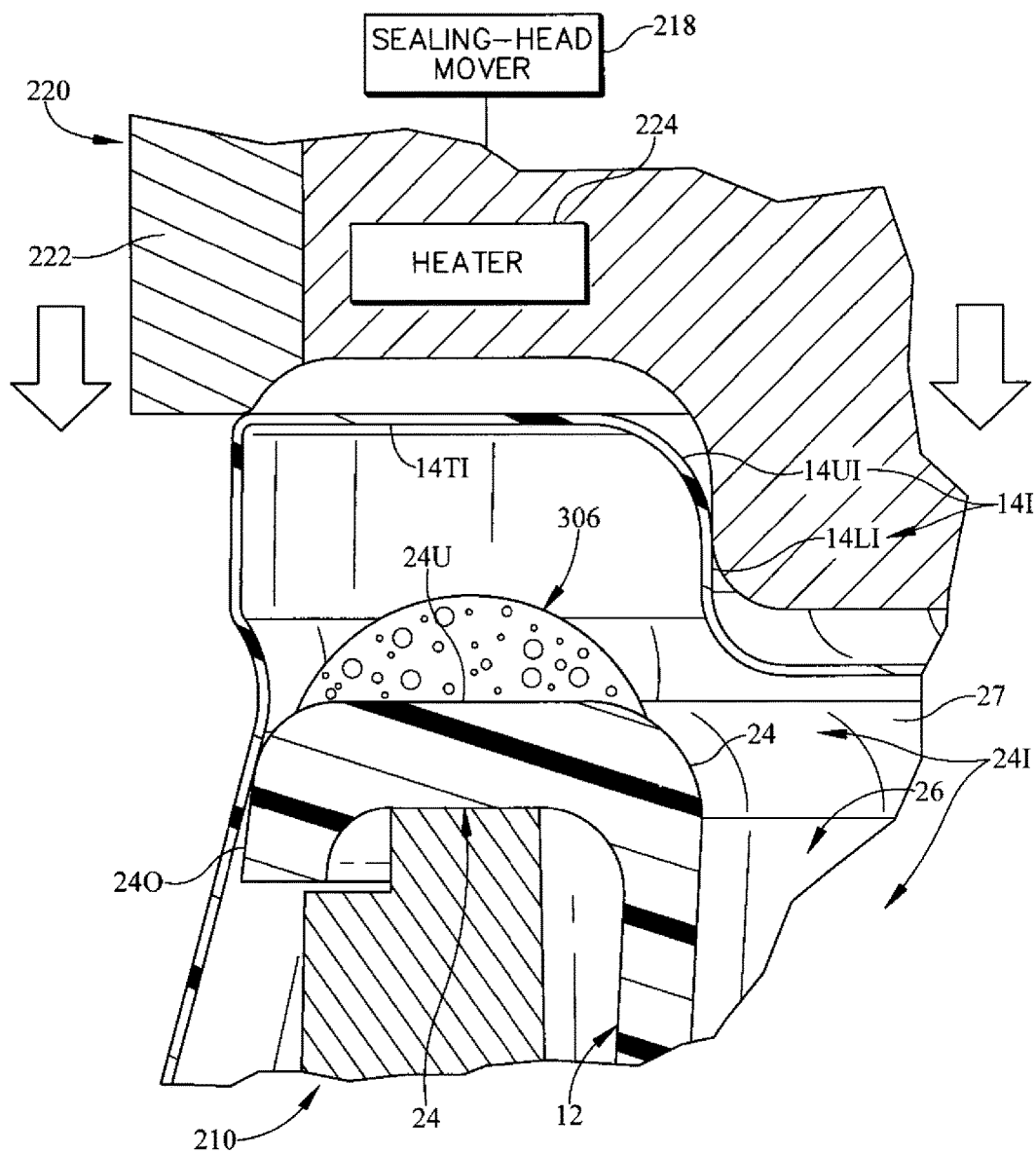
FIGS. 8A-8D show an illustrative process for moving the lid downwardly using the sealing head to establish a mechanical coupling between the lid and the container brim.
Figure 8B:
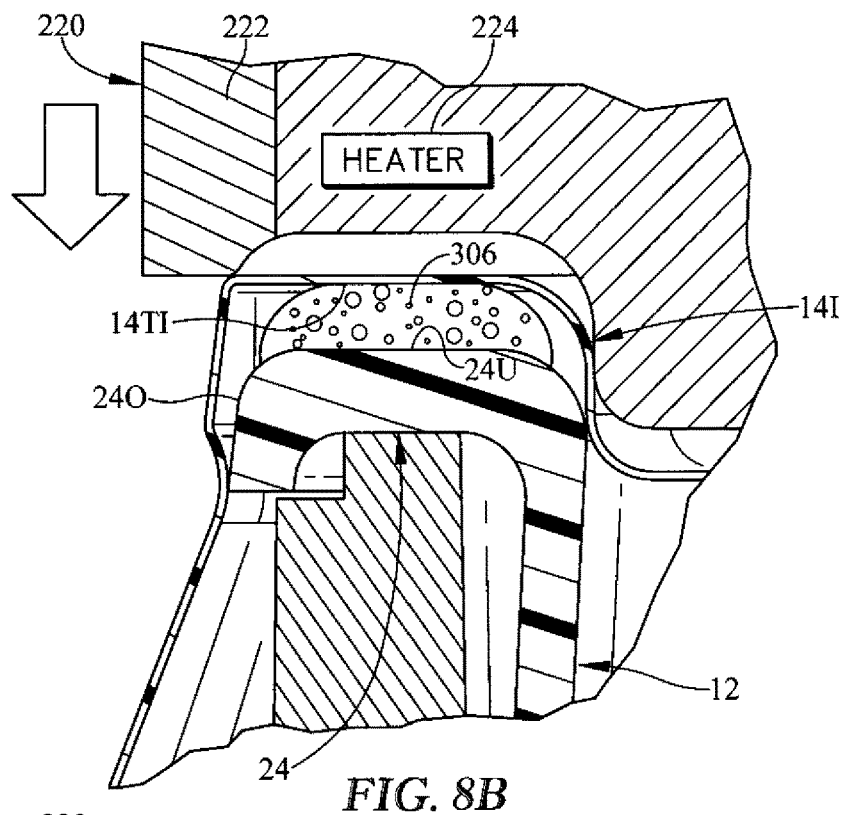
Figure 8C:
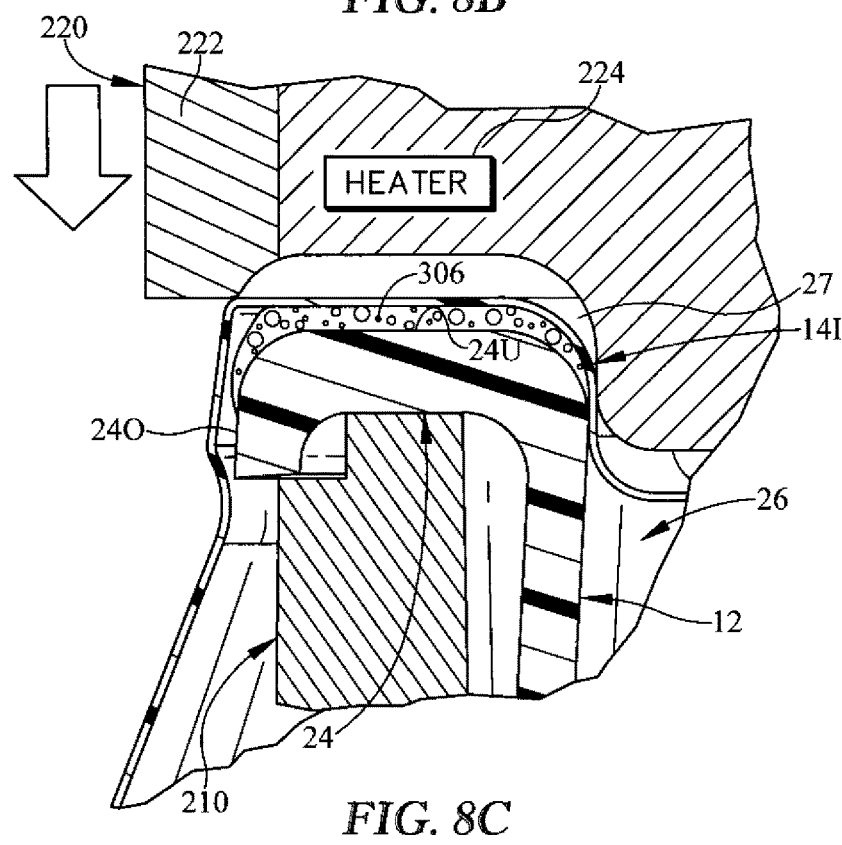
Figure 8D:
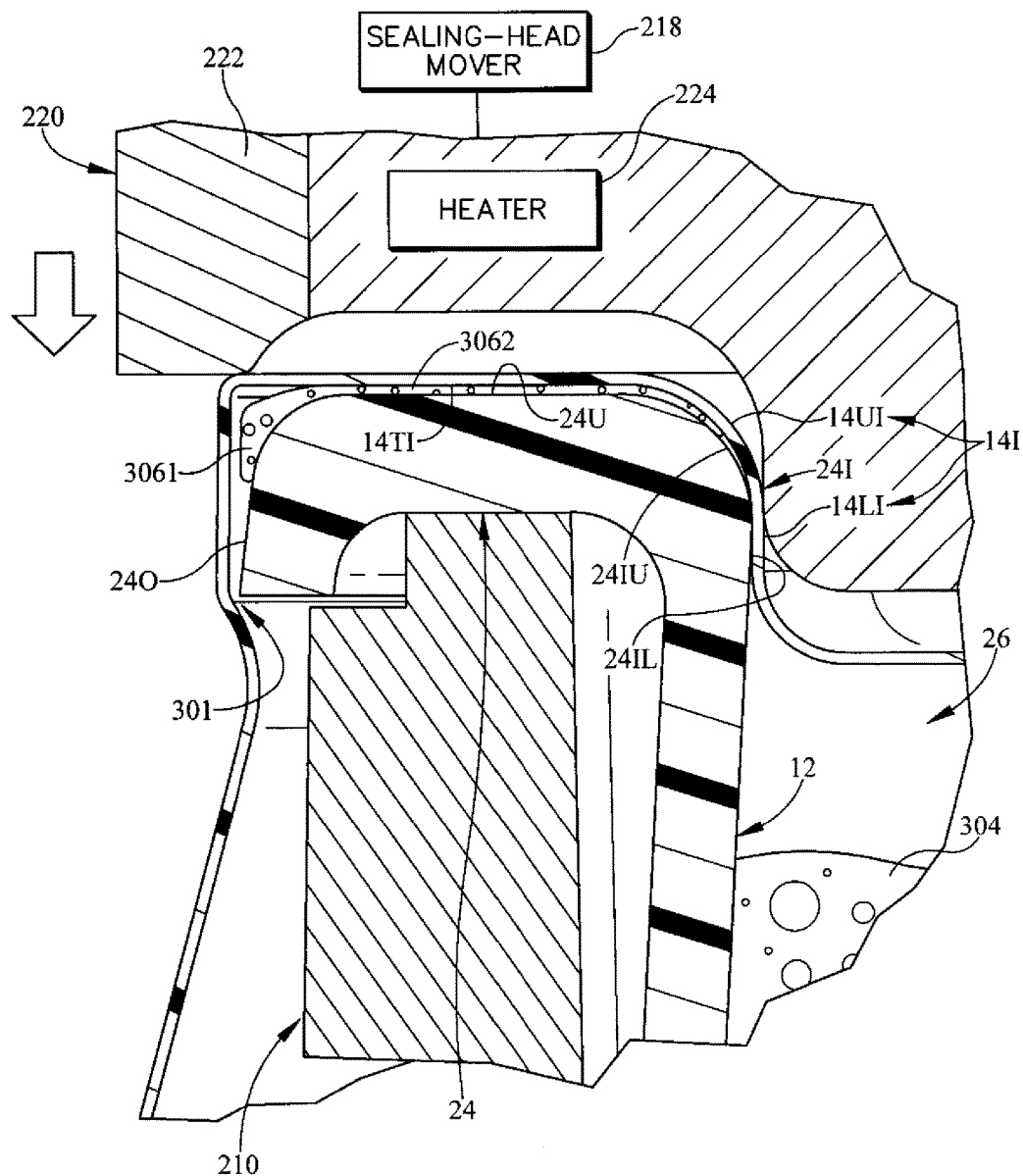

As suggested in FIG. 8D, downwardly moving lid 14 has arrived in a subsequent fourth engaged (coupled) position on brim 24 of container 12 to establish a mechanical coupling between lid 14 and container brim 24. A small first portion 3061 of mound 306 of spilled food located on the upwardly facing surface 24U of container brim 24 has been pushed radially outwardly to lie along an outer peripheral surface 24O of container brim 24. A remaining second portion 3062 of the mound 306 of spilled food remains on the upwardly facing surface 24U of container brim 24 to provide a relatively thin layer 3062 of spilled food 306 on container brim 24.

Figure 9A:
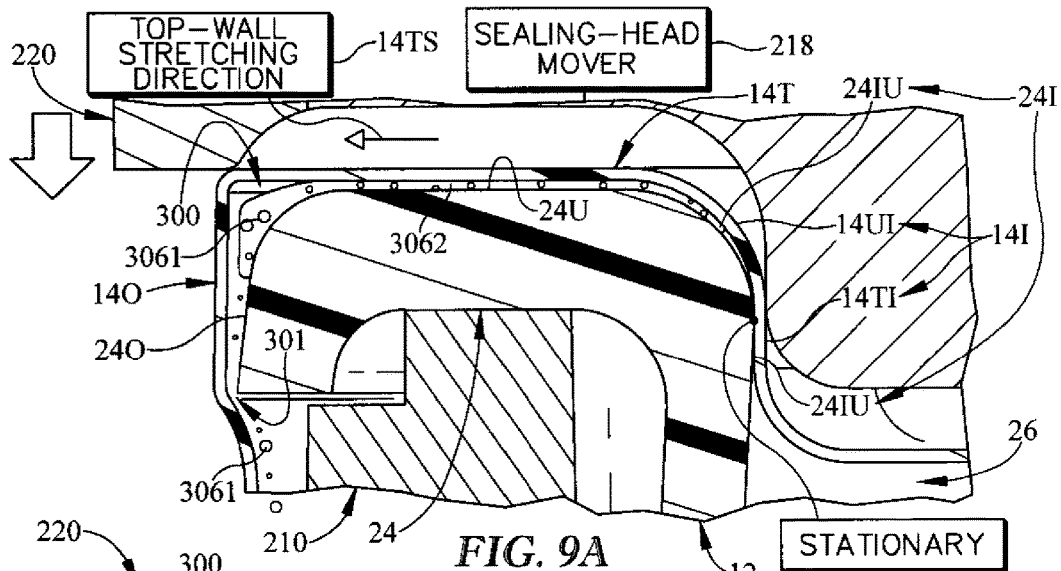
FIGS. 9A-9C show an illustrative process of wiping (i.e., squeegeing) the remaining thin layer of spilled food from the upwardly facing surface of the container brim to allow such food to exit a space provided between an outer peripheral surface of the brim and an outer rim of the lid in response to further downward movement of the lid relative to the container to remove substantially all spilled food from the container brim and thereby increase the surface contact area of the top wall of the lid on the brim of the container.
Figure 9B:
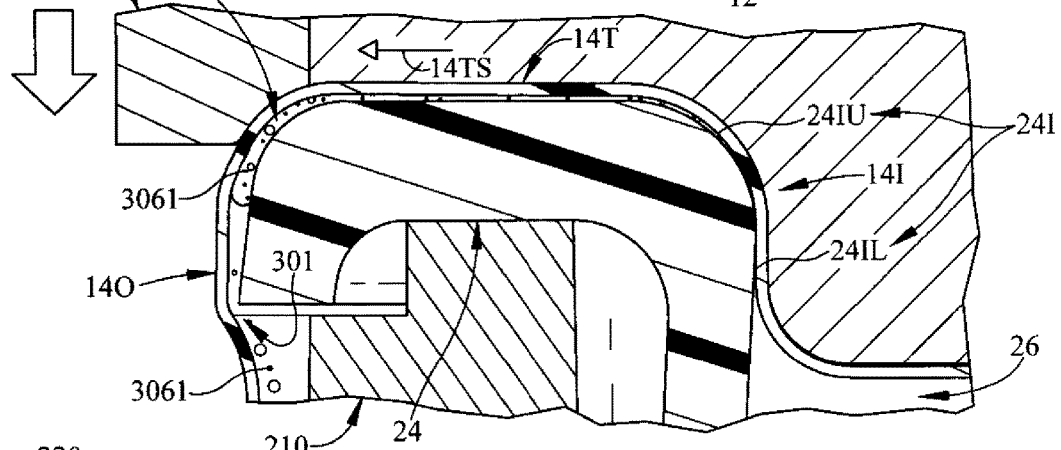
Figure 9C:
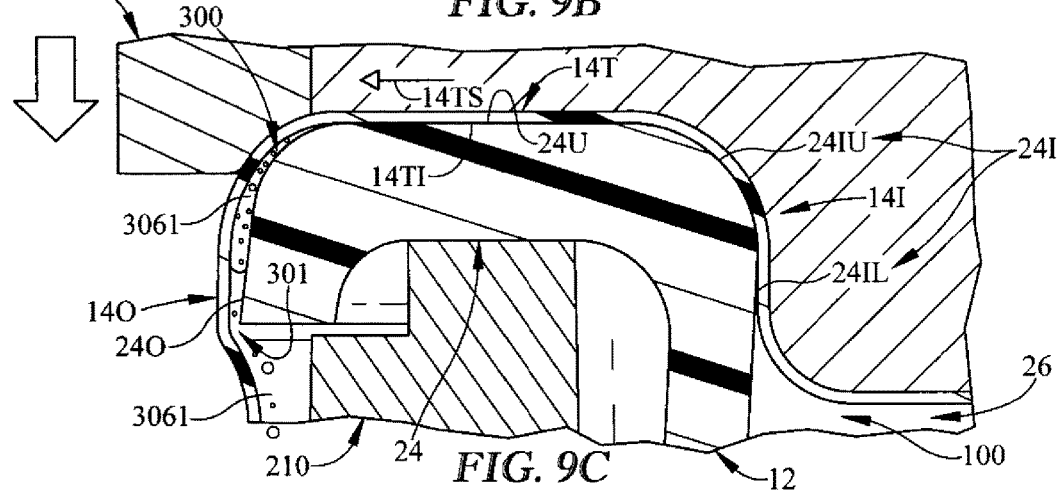

An illustrative process of wiping (i.e., squeegeing) the remaining thin layer 3062 of spilled food 306 from the upwardly facing surface 24U of container brim 24 in response to further downward movement of lid 14 relative to container 12 is shown, for example, in FIGS. 9A-9C, to remove substantially all spilled food 306 from container brim 24 and thereby increase the surface contact area of top wall 14T of lid 14 on brim 24 of container 12. As suggested in FIG. 9A, the downwardly moving lid 14 has arrived in a subsequent fifth engaged position on brim 24 of container 12 to cause an inner rim 14I of the lid 14 to engage a surrounding inner peripheral surface 24I of brim 24 so as to limit radially outward movement of inner rim 14I relative to container brim 24 so as to stretch top wall 14T of lid 14 further to displace some of the thin layer 3062 of spilled food 306 remaining on upwardly facing surface 24U of container brim 24 and move it in a radially outward direction off upwardly facing surface 24U to increase the surface contact area between top wall 14T of lid 14 relative to the stationary inner rim 14I of lid 14 and container brim 24. Displaced food 3061 can exit a space 300 that is provided between lid 14 and brim 24 through a downward facing opening 301 as suggested in FIGS. 9A-9C. As suggested in FIG. 9B, further stretching of top wall 14T of lid 14 relative to the stationary inner rim 14I of lid 14 takes place as the downwardly moving lid 14 reaches a subsequent sixth engaged position on container brim 24 to displace more spilled food 3062 and move that displaced food 3062 off container brim 24 to increase further the surface contact area between top wall 14T of lid 14 and container brim 24. As suggested in FIG. 9C, still more stretching of top wall 14T of lid 14 relative to inner rim 14I takes place as the downwardly moving lid 14 reaches a subsequent seventh engaged position on container brim 24 to displace substantially all of the spilled food 306 to increase still further the surface contact area between top wall 14T of lid 14 and container brim 24.

A heater 224 provided in the movable sealing head 220 has been activated to apply downwardly directed heat 220H to the stretched top wall 14T of lid 14 to establish a chemical-bond sealed connection 101 between the stretched top wall 14T of lid 14 and underlying portions of container brim 24 as suggested in FIG. 10. In illustrative embodiments, any minute quantity of residual spilled food 3062 left on the upwardly facing surface 24U of brim 24 is gasified during exposure of the stretched top wall 14T of lid 14 to downwardly directed heat 220H from the heater 224 and passed as a gas 306G through top wall 14T of lid 14 to the surroundings so that no spilled product 306 remains on container brim 24.

Lid 14 comprises a peelable and resealable sealant material or layer that in illustrative embodiments is configured to engage container brim 24 to provide means for establishing a fluid seal between lid 14 and container 12 each time the reclosable lid 14 is mated with container brim 24 so that ingress of oxygen and other contaminants into product-storage region 26 formed in container 12 is blocked while lid 14 is mated to container 12. Lid 14 can be removed from container 12 and reclosed in one piece repeatedly by a consumer and, in certain embodiments, still establish a fluid seal between lid 14 and container 12 each time lid 14 is mated to container 12.

Lid 14 is made of a composition in accordance with the present disclosure that functions to establish a fluid seal between lid 14 and container brim 24 each time the removable and reclosable lid 14 is mounted on container 12 in certain embodiments of the present disclosure. Thus, a fluid seal is created between lid 14 and container 12 that is opened easily by a consumer and that is later resealable.

In a container-filling process in accordance with the present disclosure, a product 304 (e.g., food) is deposited by a dispenser 302 into interior product-storage region 26 formed in container 12 as suggested in FIG. 1. Then lid 14 is mounted on container 12 to close an opening 27 into product-storage region 26 and to cause the peelable and resealable sealant layer established in lid 14 to mate with brim 24 of container 12 so that a mechanical seal is established as suggested in FIGS. 3, 4, 7, and 8D. Then, for example, the peelable and resealable sealant layer included in top wall 14T of lid 14 is welded to container brim 24 using downwardly directed heat 220H applied by heater 224 so that a chemical-bond sealed connection 101 is established. It is within the scope of the present disclosure to couple top wall 14T of lid 14 to container brim 24 through heat 220H applied by conduction or transmission of ultrasonic or electromagnetic energy.

A process is provided in accordance with the present disclosure for coupling a lid 14 to a brim 24 of a container 12 to close an opening 27 into an interior product-storage region 26 formed in the container 12 as suggested in FIG. 1. The process comprises the steps of providing a lid 14 having an elastic top wall 14T made of an elastic material and moving the elastic top wall 14T of lid 14 downwardly toward the annular brim 24 of container 12 to cause a radially inner portion 14I of the lid 14 to contact a surrounding inner peripheral surface 24I of the annular brim 24 and to locate any spilled product 306 extant on the upwardly facing surface 24U of the annular brim 24 under a downwardly facing surface 14TI of the elastic top wall 14T of the lid 14 as suggested in FIGS. 8A-8D.

The process further comprises the step of stretching the elastic top wall 14T of lid 14 in radially outward top-wall stretching direction 14TS relative to the radially inner portion 14I of lid 14 during further downward movement of lid 14 relative to brim 24 of container 12 as suggested in FIGS. 9A-9C to move substantially all of the spilled product 306 extant on the upwardly facing surface 24U of the annular brim 24 in a radially outward direction and cause substantially all of the upwardly facing surface 24U of annular brim 24 to be free of spilled product 306 and to mate with a confronting companion portion of the downwardly facing surface 14TI of elastic top wall 14T of lid 14 therebetween so that substantially all of the spilled product 306 formerly extant on the upwardly facing surface 24U of annular brim 24 is wiped away as suggested in FIG. 10. In illustrative embodiments, spilled product 306 wiped from annular brim 24 is deposited into a radially outer space 300 provided between lid 14 and outer peripheral surface 24O of annular brim 24 so that it can exit that space 300 through an opening 301 provided between outer peripheral surface 24O of brim 24 and outer rim 14O of lid 14 as suggested in FIGS. 9A-9C and 10. Container 12 has an annular brim 24 arranged to surround an opening 27 into an interior product-storage region 26 formed in the container 12. Annular brim 24 includes an inner peripheral surface 24I bounding the opening 27, an outer peripheral surface 24O surrounding the inner peripheral surface 24I, and an upwardly facing surface 24U lying between and interconnecting the inner and outer peripheral surfaces 24I, 24O as suggested in FIGS. 7 and 8A.

The process further comprises the step of heating elastic top wall 14T of lid 14 to establish a chemical-bond sealed connection 101 between elastic top wall 14T of lid 14 and upwardly facing surface 24U of annular brim 24 of container 12 as suggested in STEP 5 of FIG. 1 and in FIG. 10. Heat 220H in excess of a selected temperature is applied to elastic top wall 14T of lid 14 during the heating step to cause any residual spilled product 3063 located on the upwardly facing surface 24U of annular brim 24 in a space provided between elastic top wall 14T of lid 14 and annular brim 24 of container 12 after the stretching step to be gasified and pass as a gas 306G from the space through elastic top wall 14T of lid 14 into the surroundings so that no spilled product remains on annular brim 24 of container 12 as suggested in FIG. 10.

A radially outwardly moving squeegeing action takes place along the upwardly facing surface 24U of annular brim 24 and from inner peripheral surface 24I of annular brim 24 toward outer peripheral surface 24O of annular brim 24. This squeegeing action functions to wipe substantially all of the spilled product 306 extant on the upwardly facing surface 24U of annular brim 24 in a radially outward direction off annular brim 24 during movement of the elastic top wall 14T of lid 14 on annular brim 24 during the stretching step.

The process further comprises the step of heating the and from of lid 14 using a heater 224 after the stretching step as suggested in FIGS. 1 and 10. The inner surface 14TI of top wall 14T of lid 14 is configured to provide means for chemically bonding with the upwardly facing surface 24U of annular brim 24 during the heating step, separating from the upwardly facing surface 24U of annular brim 24 in response to application of an external peeling force to top wall 14T of lid 14 to disengage lid 14 from annular brim 24 of container 12, and mating temporarily and repeatedly with the upwardly facing surface 24U of annular brim 24 of container 12 to close the opening 27 into the interior product-storage region 26 formed in container 12 each time lid 14 is coupled to container 12 by a consumer so that any product 304 stored in the interior product-storage region 26 is retained in a chamber 100 defined by container 12 and lid 14 as suggested in FIG. 2C.

A process is provided for coupling a lid 14 to a brim 24 of a container 12 to close an opening 27 into an interior product-storage region 26 formed in the container 12 as suggested in FIG. 1. The process comprises the steps of filling an interior product-storage region 26 formed in a container 12 with product 304, placing a lid 14 on the brim 24 of the container 12 to cover an opening 27 into the interior product-storage region 26, moving a sealing head 220 downwardly toward a container 12 received in a container-receiving support fixture 210 to apply downwardly directed force 220F to the lid 14 while the lid 14 is on the brim 24 of the container 12 to couple the lid 14 mechanically to the brim 24 and to move a top wall 14T of the lid 14 laterally relative to the brim 14 to wipe any spilled product 306 off the brim 24 while the lid 14 remains coupled to the brim 24, and using a heater 224 associated with the sealing head 220 to apply heat 220H to the top wall 14T of the lid 14 while the lid 14 remains mechanically coupled to the brim 24 to establish a chemical-bond sealed connection 101 between the top wall 14T of the lid 14 and the brim 24 of the container 12.

The heater 224 is operated to apply heat 220H in excess of a selected temperature to the top wall 14T of the lid 14. This causes any residual spilled product 306 located on the brim 24 after the moving step to be gasified and pass as a gas 306G through the top wall 14T of the lid 14 to the surroundings.

It is unnecessary to attach a separate closure film or foil to the container on the filling line after container 12 has been filled and before lid 14 is mounted on container 12 when using a lid 14 in accordance with the present disclosure owing, in part, to the provision of a peelable and resealable sealant layer 323 in the lid 14 disclosed herein. Packaging cost and complexity is thus minimized and the customer is provided with an easy-to-use product that is characterized by sustainability. The peelable and releasable sealant layer is peelable and resealable.

A package in accordance with the present disclosure is well-suited for use in hot-filled non-barrier containers. It may also be used in barrier, retortable containers. Sustainability is enhanced because the lid is made of like materials without the inclusion of metal rings or other non-plastics materials in illustrative embodiments.

The invention claimed is:

1. A process for coupling a lid to a brim of a container to close an opening into an interior product-storage region formed in the container, the process comprising the steps of
providing a lid having an elastic top wall made of an elastic material and a container having an annular brim arranged to surround an opening into an interior product-storage region formed in the container, wherein the annular brim includes an inner peripheral surface bounding the opening, an outer peripheral surface surrounding the inner peripheral surface, and an upwardly facing surface lying between and interconnecting the inner and outer peripheral surfaces,
moving the elastic top wall of the lid downwardly toward the annular brim of the container to cause a radially inner portion of the lid to contact the inner peripheral surface of the annular brim and to locate any spilled product extant on the upwardly facing surface of the annular brim under a downwardly facing surface of the elastic top wall of the lid, and
deforming the elastic top wall of the lid relative to the radially inner portion of the lid during further movement of the lid relative to the brim of the container to move substantially all of the spilled product extant on the upwardly facing surface of the annular brim in a radially outward direction away from the interior product-storage region and into a radially outer space provided between the lid and the outer peripheral surface of the annular brim to cause substantially all of the upwardly facing surface of the annular brim to be free of spilled product and to mate with a confronting companion surface of the downwardly facing surface of the elastic top wall of the lid therebetween so that substantially all of the spilled product formerly extant on the upwardly facing surface of the annular brim is wiped away.

2. The process of claim 1, further comprising the step of heating the elastic top wall of the lid to establish a chemical-bond sealing connection between the elastic top wall of the lid and the upwardly facing surface of the annular brim of the container.

3. The process of claim 2, wherein heat in excess of a selected temperature is applied to the elastic top wall of the lid during the heating step to cause any residual spilled product located on the upwardly annular brim in a space provided between the elastic top wall of the lid and the annular brim of the container after the deforming step to be gasified and pass as a gas from the space through the elastic top wall of the lid into the surroundings so that no spilled product remains on the annular brim of the container.

4. The process of claim 1, wherein the lid includes an inner rim providing the radially inner portion and outer rim arranged to surround the inner rim, the elastic top wall is arranged to interconnect the inner and outer rims of the lid, the outer rim of the lid is arranged to surround the outer peripheral surface of the brim, and the inner rim is arranged to mate with the inner peripheral surface of the annular brim to locate a central plate included in the lid and coupled to the inner rim in the interior product-storage region formed in the container to close the opening into the interior product-storage region and limit movement of the inner rim of the lid relative to the annular brim during the deforming step.

5. The process of claim 1, wherein the inner peripheral surface of the annular brim has an annular convex rounded shape and the lid is deformed to mate with and move on the inner peripheral surface of the annular brim without piercing the lid as the lid continues to move relative to the container.

6. The process of claim 5, wherein the inner peripheral surface of the annular brim includes a lower segment coupled to a side wall of the container and an upper segment arranged to interconnect the upwardly facing surface and the lower segment, the upper segment has an annular convex rounded shape, and the lower segment has an annular shape.

7. The process of claim 1, further comprising the step of heating the elastic top wall of the lid after the deforming step and wherein the inner surface of the elastic top wall of the lid is configured to provide means for chemically bonding with the upwardly facing surface of the annular brim during the heating step, separating from the upwardly facing surface of the annular brim in response to application of an external peeling force to a membrane sheet to disengage the lid from the annular brim of the container, and mating temporarily and repeatedly with the upwardly facing surface of the annular brim of the container to close the opening into the interior product-storage region formed in the container each time the lid is coupled to the container by a consumer so that any product stored in the interior product-storage region is retained in a sealed chamber defined by the container and the lid.

8. The process of claim 1, wherein the lid includes a brim-mount frame coupled to the annular brim and formed to include the elastic top wall, the brim-mount frame is also formed to include an inner rim coupled to an inner edge of the elastic top wall and configured to provide the radially inner portion and arranged to engage the inner peripheral surface of the annular brim and extend downwardly into the interior product-storage region formed in the container, and the brim-mount frame also includes an outer rim coupled to an outer edge of the elastic top wall and arranged to surround the inner rim to engage the outer peripheral surface of the annular brim.

9. The process of claim 8, wherein the lid further includes a cover foundation coupled to the inner rim of the frame and arranged to overlie the interior product-storage region of the container and a cover coupled to the cover foundation to close the opening into the interior product-storage region.

10. The process of claim 9, wherein the cover is coupled permanently to the cover foundation.

11. The process of claim 9, wherein the frame, cover foundation, and cover cooperate to form a monolithic component.

12. The process of claim 1, wherein the lid further includes an outer rim surrounding the annular brim and an inner rim surrounded by the outer rim and arranged to lie in spaced apart relation to the outer rim, the inner rim is formed to include the radially inner portion, and the elastic top wall of the lid is arranged to interconnect the outer and inner rims.

13. The process of claim 12, wherein the lid further includes an annular lid-retention lip coupled to the outer rim and arranged to extend radially inwardly under the annular brim to anchor a frame mechanically to the annular brim of the container.

* * * * *